3,193,409
ALKALI-STABLE THIN-BOILING STARCHES AND METHOD OF MAKING SAME
Wilbur C. Schaefer and Charles R. Russell, Peoria, Ill., assignors to the United States of America as represented by the Secretary of Agriculture
No Drawing. Filed Jan. 16, 1963, Ser. No. 251,984
4 Claims. (Cl. 127—33)
(Granted under Title 35, U.S. Code (1952), sec. 266)

A nonexclusive, irrevocable, royalty-free license in the invention herein described, throughout the world for all purposes of the United States Government with the power to grant sublicenses for such purposes, is hereby granted to the Government of the United States of America.

This invention relates to a method of producing new and useful granular starches that readily gelatinize in hot water to provide alkali-stable thin-boiling starches and to the products produced thereby. It is our particular objective to provide granular starches that readily disperse and paste in hot water to thin-boiling starches which encompass a broad range of paste viscosities in aqueous systems and exhibit high stability to alkali and high strengths in film coatings cast therefrom.

The production of thin-boiling starches from unmodified starch by treatment with aqueous acids is well known. However, these prior art thin-boiling starches exhibit increasing sensitivities to depolymerization by alkali as their thinness or fluidity increases. Instability in alkali is particularly evident in the prior art thin-boiling starches with intrinsic viscosities below about 0.60 deciliter per gram (dl./g.) Viscosities in this range are required for most adhesive and sizing operations in order to obtain workable pastes having the required solids content. Moreover, alkaline reagents, such as sodium hydroxide and borax, are often needed in starch-based adhesives and sizes to facilitate gelatinization and effect uniform dispersion. For such applications, the aforementioned prior art thin-boiling starches are ill suited because they undergo degradation in alkaline systems with progressive loss of paste viscosity. This problem has been overcome by our development of a novel series of thin-boiling starches which show virtually no change in their stability toward alkali over a broad range of respective initial viscosities. Our invention is based on the surprising discovery that treatment of unmodified starch with chlorine in methanol or with hydrogen chloride in methanol produces thin-boiling starches having unusual stability to alkali.

The present inventors, as shown in U.S. Patent No. 3,033,851, have previously subjected periodate-oxidized dialdehyde starch to reaction with methanolic solutions of anhydrous chlorine or anhydrous hydrogen chloride to obtain heterofunctional derivatives containing methoxyl, carboxyl, and carbonyl functionalities. However, in sharp contrast to dialdehyde starch, which is known to have a carbonyl D.S. of up to practically 2.0 and thus would be expected to provide a very large number of sites for reaction with the methanol and the chlorine, ordinary starch is essentially devoid of carbonyl functionality and would not be expected to react to any significant extent with the acid-containing methanolic solution. Furthermore, whereas the similarly prepared heterofunctional derivatives of dialdehyde starch are extremely sensitive to degradation by alkali, our novel products, in either the granule form or in the form of an aqueous dispersion or paste, are not. Also, since it is very well known to form thin-boiling starches by reaction with aqueous mineral acid, it would be absurd and commercially unobvious, to try to obtain even the prior art alkali-sensitive thin-boiling starches by reaction in a more costly solvent.

We are unable to satisfactorily explain this unusual stability to alkali since neither methoxyl groups nor chlorine groups could be detected in our products by conventional methods of analysis. Conversion of the very limited number of original reducing end groups and other carbonyl groups or any groups produced during the reaction by chain scission, or by oxidation in the case of chlorine, to methyl acetal and methyl ketal groups should confer a stabilizing influence toward alkali. However, the inability to detect methoxyl groups in our products makes it uncertain as to whether the said surprising stability to alkali is brought about by the foregoing speculative reaction mechanisms.

The comparative stability toward alkali of several of our typical products and a series of commercial thin-boiling starches of comparable intrinsic viscosities are given in Table I. The alkali lability numbers were all determined by the standard method shown in Kerr, Chemistry and Industry of Starch, Academic Press, Inc. (1950), pp. 679–680, and represent the relative quantities of alkali consumed by equal amounts of the test products. This value increases as the products become more alkali labile, i.e., more susceptible to degradation by alkali.

TABLE I

*Comparative alkali lability of commercial thin-boiling starches and those derived from corn starch by treatment with methanolic chlorine*

| Methanolic chlorine | | Commercial products | |
|---|---|---|---|
| Intrinsic viscosity, dl./g. | Alkali No. | Intrinsic viscosity, dl./g. | Alkali No. |
| 0.63 | 21 | 0.65 | 16 |
| 0.41 | 20 | 0.45 | 27 |
| 0.32 | 19 | | |
| 0.22 | 15 | 0.24 | 47 |
| 0.06 | 17 | | |

The data in Table I clearly show that the commercial products become increasingly labile as their intrinsic viscosity decreases, whereas our products actually become less susceptible to alkali, i.e., more stable as their intrinsic viscosity decreases. Data for products resulting from the substitution of hydrogen chloride for chlorine are not given in Table I, but these products exhibit equal, if not greater, stability to alkali over the entire viscosity range as will be apparent from the data in Examples 2 and 4. This unusual property of our products makes them especially useful as carrier pastes for granular whole starch in corrugated boxboard adhesive formulations where alkaline conditions are required in order to achieve gelatinization of the granular starch at practical operating temperatures and contact times.

Unsupported films prepared from our aqueous dispersed products by conventional casting techniques possess much higher tensile strength than films prepared from comparable viscosity grades of prior art thin-boiling starches derived from whole starch by treatment with either aqueous acids or aqueous oxidizing agents. These comparative film strengths are given in Table II.

TABLE II

*Comparative film strength of commercial thin-boiling starches and products derived from starch by the present process*

| Starch product | Intrinsic viscosity, dl./g. | Tensile strength of film Kg./mm.² |
|---|---|---|
| Commercial 60-fluidity starch | 0.65 | 2.14 |
| From ½-hour reaction by present process | 0.49 | 4.28 |
| Commercial oxidized starch | 0.40 | 3.31 |
| From 1-hour reaction by present process | 0.32 | 4.49 |
| Commercial 90-fluidity starch | 0.23 | Cracked on drying |
| From 2-hour reaction by present process | 0.22 | 3.66 |

Other factors being equal, products with highest intrinsic viscosity should yield films having the greatest tensile strength. Yet our products, despite their comparatively lower viscosity, had higher tensile strength than their commercial counterparts. This property of our products, together with their stability toward alkali, makes them exceptionally useful as adhesives for gummed labels and tapes, as clay coating adhesives for paper, and as sizing agents for paper and textiles.

Our process in addition to yielding premium thin-boiling starches also has a number of other advantages not inherent in prior art processes which employ aqueous acids or aqueous oxidizing agents. For example, our process is more rapid and gives nearly quantitative yields over a very broad viscosity range, whereas prior art aqueous processes must be limited to a considerably narrower viscosity range if excessive degradation is to be avoided so as to permit obtaining high yields.

In our process, the following general procedure has been employed. One part unmodified starch containing about 11 percent moisture is slurried in 1.1 parts of reagent grade anhydrous methanol containing either chlorine or hydrogen chloride at concentrations ranging from about 1 to 5 weight percent based on the methanol. The resulting slurry is stirred and, depending on the viscosity desired, the reaction is conducted at temperatures ranging from about 25 to 45° C. for periods of time up to 2 hours. The resulting product in unswollen original granule form is easily recovered from the reaction slurry by simple filtration, neutralized to a pH of about 6.5 in aqueous bicarbonate, washed in several changes of water, and dried in air at room temperature. When the upper limits of reagent concentration and time are employed, temperatures much above 45° C. cause large extents of degradation and result in impractically low product recoveries.

The influence of reaction variables on the yield and properties of products are shown in Tables III, IV, and V.

TABLE III

*Influence of reaction time on yield and physical properties of products obtained from reaction with 5% methanolic chlorine at 45° C.*

| Reaction time, hour | Yield, original starch basis, percent | Intrinsic viscosity, dl./g. | Clarity of 1% paste, percent | Amylograph data ||||| 
|---|---|---|---|---|---|---|---|---|
| | | | | Concentration, g./100 ml. | Pasting || Viscosity ||
| | | | | | Temperature at start °C.[1] | Time range, minute [2] | 55° C., cp. | 25° C., cp. |
| 0 [3] | | 1.69 | 19 | 10 | 68 | 14 | 1,825 | 1,825 |
| 0.5 | 98 | 0.49 | 66 | 10 | 70 | 6 | 225 | 320 |
| 1.0 | 98 | 0.32 | 80 | 10 | 72 | 18 | 80 | 90 |
| 2.0 | 96 | 0.22 | 74 | 30 | 60 | 14 | 40 | 105 |

[1] Start of pasting is defined as the point at which the amylograph curve exhibits the maximum increase in rate of viscosity rise; i.e., the point at which the second derivative of viscosity with respect to time is at a maximum.
[2] Pasting range is the time from the start of pasting until maximum viscosity is reached.
[3] Unmodified starch.

TABLE IV

*Influence of reaction temperature on yield and physical properties of products obtained after 2-hour treatment with 5% methanolic chlorine*

| Reaction temperature, °C. | Yield, original starch basis, percent | Intrinsic viscosity, dl./g. | Clarity of 1% paste, percent | Amylograph Data |||||
|---|---|---|---|---|---|---|---|---|
| | | | | Concentration, g./100 ml. | Pasting[1] || Viscosity ||
| | | | | | Temperature at start, °C. | Time range, minutes | 55° C., cp. | 25° C., cp. |
| 25 | 98 | 0.63 | 25 | 10 | 69 | 7 | >1,825 | >1,825 |
| 45 | 96 | 0.22 | 74 | 30 | 60 | 14 | 40 | 105 |
| 65 [2] | 56 | 0.06 | 74 | 50 | 45 | 10 | 250 | 450 |

[1] See Table III, footnotes a and b.
[2] Refluxed.

TABLE V

*Influence of reagent concentration and type on yield and properties of products obtained from 2-hour reaction at 45° C.*

| Reagent and concentration | Yield, original starch basis, percent | Intrinsic viscosity, dl./g. | Clarity of 1% paste, percent | Amylograph Data | | | | |
|---|---|---|---|---|---|---|---|---|
| | | | | Concentration, g./100 ml. | Pasting [1] | | Viscosity | |
| | | | | | Temperature at start, °C. | Time range, minutes | 55° C., cp. | 25° C., cp. |
| 1% Cl₂ | 99 | (2) | 31 | 10 | 67 | 8 | 1,475 | 2,075 |
| 1% HCl | 99 | 0.76 | 51 | 10 | 66 | 8 | 200 | 550 |
| 3% Cl₂ | 99 | 0.41 | 71 | 10 | 70 | 6 | 100 | 150 |
| 3% HCl | 98 | 0.35 | 81 | 20 | 66 | 8 | 150 | 1,900 |
| 5% Cl₂ | 96 | 0.22 | 74 | 35 | 61 | 15 | >1,825 | >1,825 |
| 5% HCl | 90 | 0.12 | 89 | 35 | 61 | 16 | 90 | 590 |

[1] See Table III, footnotes a and b.
[2] 17.4% of product was insoluble in 1N potassium hydroxide.

The following specific examples will further illustrate our invention and describe preferred embodiments thereof.

EXAMPLE 1

One part of corn starch containing 11.5 percent moisture was slurried in 1.1 parts of methanol containing 5 percent chlorine and stirred for 2 hours at 45° C. The product was isolated by filtration, neutralized with sodium bicarbonate to pH 6.5 in aqueous slurry, washed three times with water by slurrying on a filter, and dried in a stream of air at room temperature. Yield was 96 percent of the original starch weight.

The product had the following properties: intrinsic viscosity in 1 N potassium hydroxide, 0.22 dl./g.; alkali lability number, 15; Brabender amylography pasting temperature, 60° C.; Brookfield paste viscosity at 25° C. and 30 percent solids, 360 cps. initially and 4,300 cps. after 24 hours; clarity of 1 percent paste, 74 percent; and tensile strength of film resulting from 0.030-inch layer of 10 percent aqueous paste, 3.66 kg./mm.². When compared with a commercially available thin-boiling starch having the same intrinsic viscosity, the chlorine-methanol-derived product was found to be superior in alkali resistance (alkali number one-third that of commercial product) and in film strength (commercial product could not be tested because film cracked on drying).

EXAMPLE 2

Similar to Example 1 except that hydrogen chloride was substituted for chlorine. The resulting product, obtained in a 90-percent yield, had the following properties: intrinsic viscosity in 1 N potassium hydroxide, 0.12; alkali labliity number, 15; pasting temperature, 61° C.; Brookfield paste viscosity at 35 percent solids at 25° C., 8,600 cps. initially and more than 100,000 cps. (beyond limit of instrument) after 24 hours; and clarity of 1-percent paste, 89 percent. This product equalled the chlorine-derived product of Example 1 in alkali resistance and its paste viscosity was lower.

EXAMPLE 3

The same as Example 1 except that the reaction temperature was 25° C. The product was obtained in a 98-percent yield and had the following properties: intrinsic viscosity in 1 N potassium hydroxide, 0.63 dl./g.; pasting temperature, 69° C.; Brookfield paste viscosity at 8 percent solids at 25° C., 80,000 cps. initially and greater than 100,000 cps. after 24 hours; paste clarity at 1 percent concentration, 25 percent; alkali lability number, 21.

EXAMPLE 4

The same as Example 2 except that 1 percent instead of 5 percent hydrogen chloride was employed. The product was obtained in a 99-percent yield and had the following properties: intrinsic viscosity in 1 N potassium hydroxide, 0.76; pasting temperature, 66° C.; Brookfield paste viscosity at 10 percent concentration at 25° C., 14,000 cps. initially and 133,000 cps. after 24 hours; alkali lability number, 13; paste clarity at 1 percent concentration, 51 percent. These properties suggest the use of our novel thin-boiling starches in the manufacture of corrugated and laminated board where a starch paste carrier is used in an alkaline medium to suspend ungelatinized starch.

Having disclosed our invention, we claim:

1. Method of preparing granular starch derivatives that disperse readily in hot water to yield thin-boiling starches having improved resistance to degradation by alkaline additives comprising slurrying 1 part by weight of unmodified starch in about 1.1 parts by weight of a 1 to 5 weight percent anhydrous methanol solution of a member selected from the group consisting of anhydrous chlorine and anhydrous hydrogen chloride for between 0.5 and 2 hours at a temperature of 25° to 45° C., removing the reaction liquids to obtain the granules of reacted starch, substantially neutralizing the granules by slurrying in a weakly alkaline solution, washing the granules in several changes of water, and drying them in a stream of air at room temperature to provide a free flowing product in granule form.

2. The products obtained by the method of claim 1.

3. The method of claim 1 wherein the starch is slurried in an anhydrous methanol solution of anhydrous chlorine, the concentration of the anhydrous chlorine in the methanol is 3 percent, the reaction temperature is 45° C., the reaction time is 2 hours, and the obtained product has an intrinsic viscosity of 0.4 dl./g. in 1 N KOH.

4. A method of preparing granular starch derivatives that disperse readily in hot water to yield thin-boiling starches having improved resistance to degradation by alkaline additives which comprises slurrying unmodified starch with an anhydrous methanol solution of a member selected from the group consisting of anhydrous chlorine and anhydrous hydrogen chloride at a temperature of about from 25° to 45° C., separating granules of reacted starch from the reaction mixture, substantially neutralizing the granules with weak alkali, washing the neutralized granules free of alkali, and drying the washed granules.

References Cited by the Examiner

UNITED STATES PATENTS

| | | | |
|---|---|---|---|
| 1,871,027 | 8/32 | Bergquist | 127—33 |
| 2,238,339 | 4/41 | Nivling | 127—33 |
| 2,374,676 | 5/45 | Gardner | 127—33 |

CHARLES B. PARKER, *Primary Examiner.*